March 10, 1964  J. R. PATMORE  3,124,794
ELECTRONIC DIGITAL VOLTMETER
Filed Dec. 5, 1958  12 Sheets-Sheet 1

COMPARATOR AND DIODE GATE

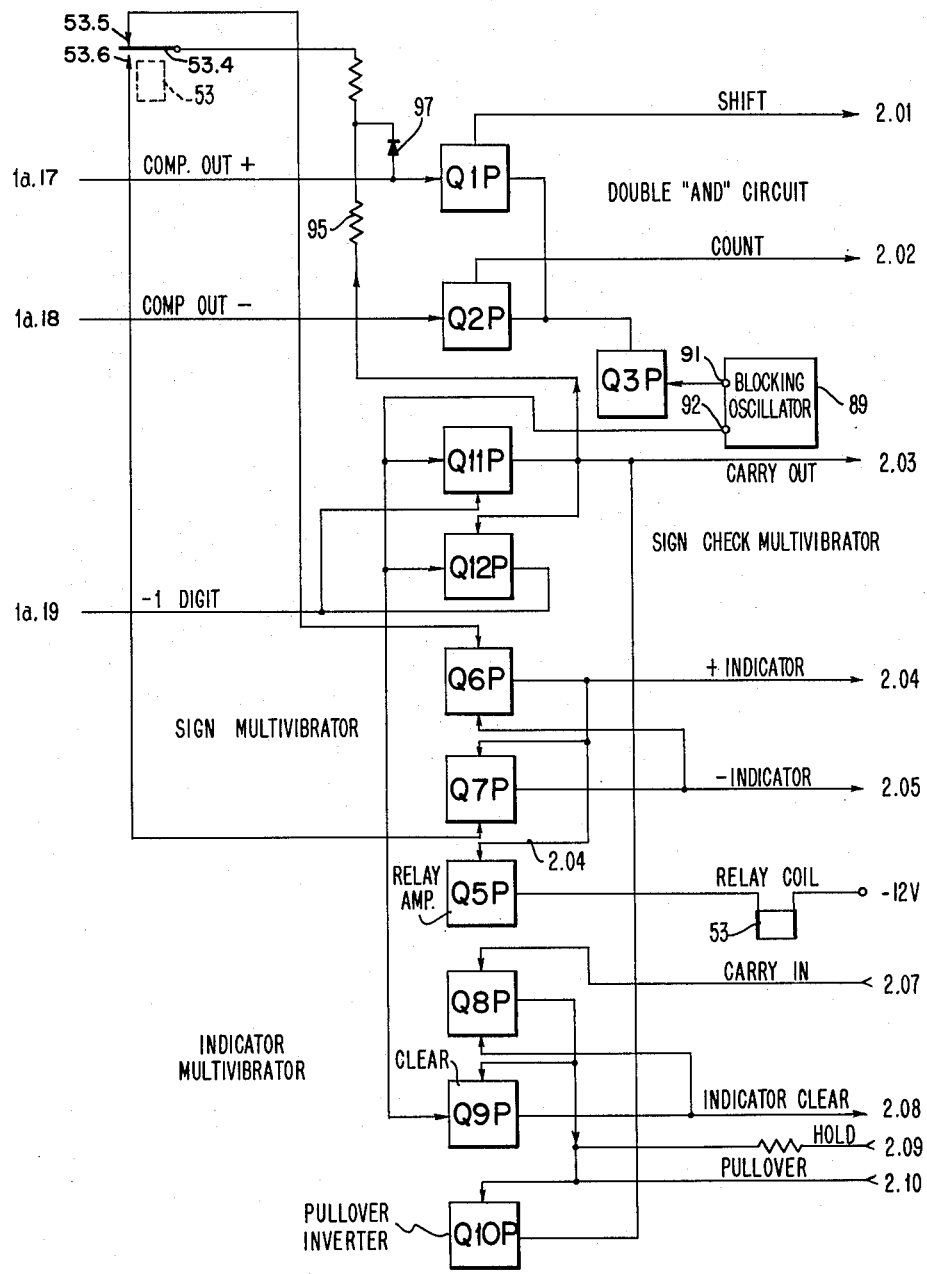

March 10, 1964 — J. R. PATMORE — 3,124,794
ELECTRONIC DIGITAL VOLTMETER
Filed Dec. 5, 1958 — 12 Sheets-Sheet 4

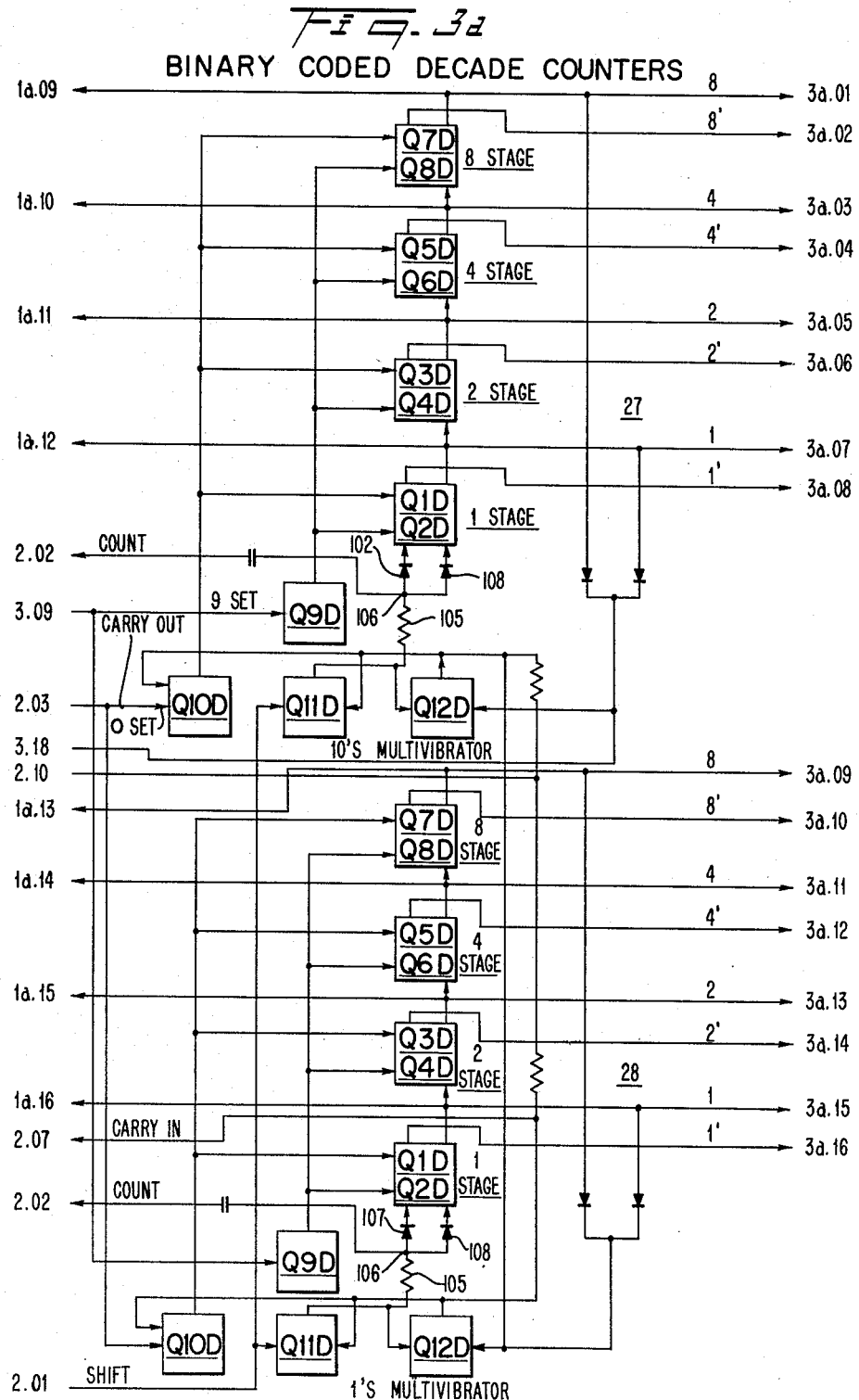

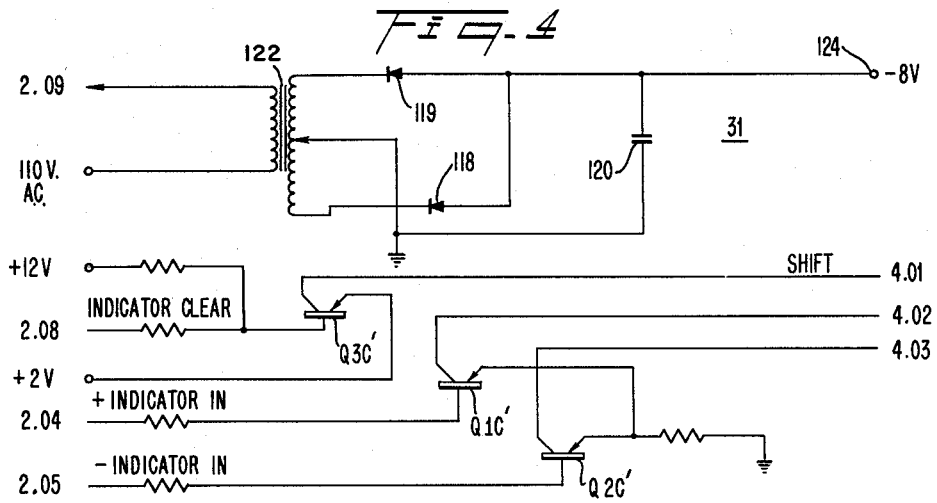
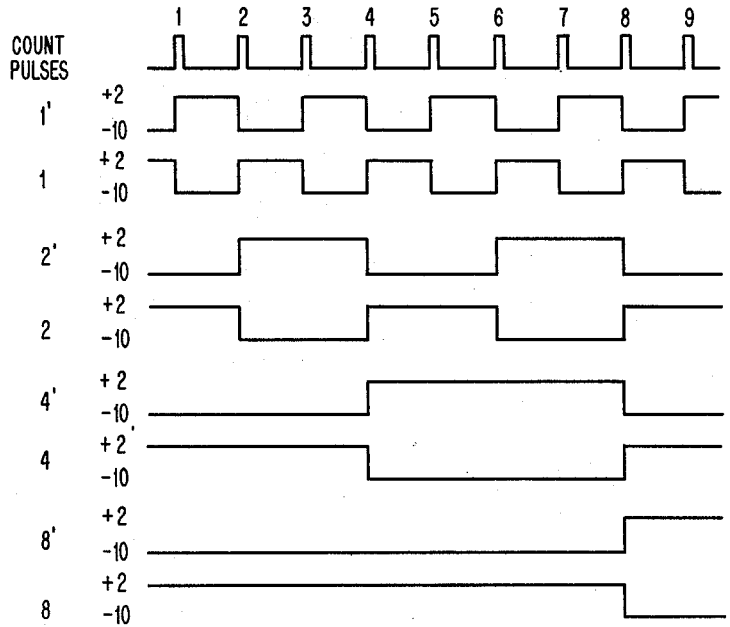

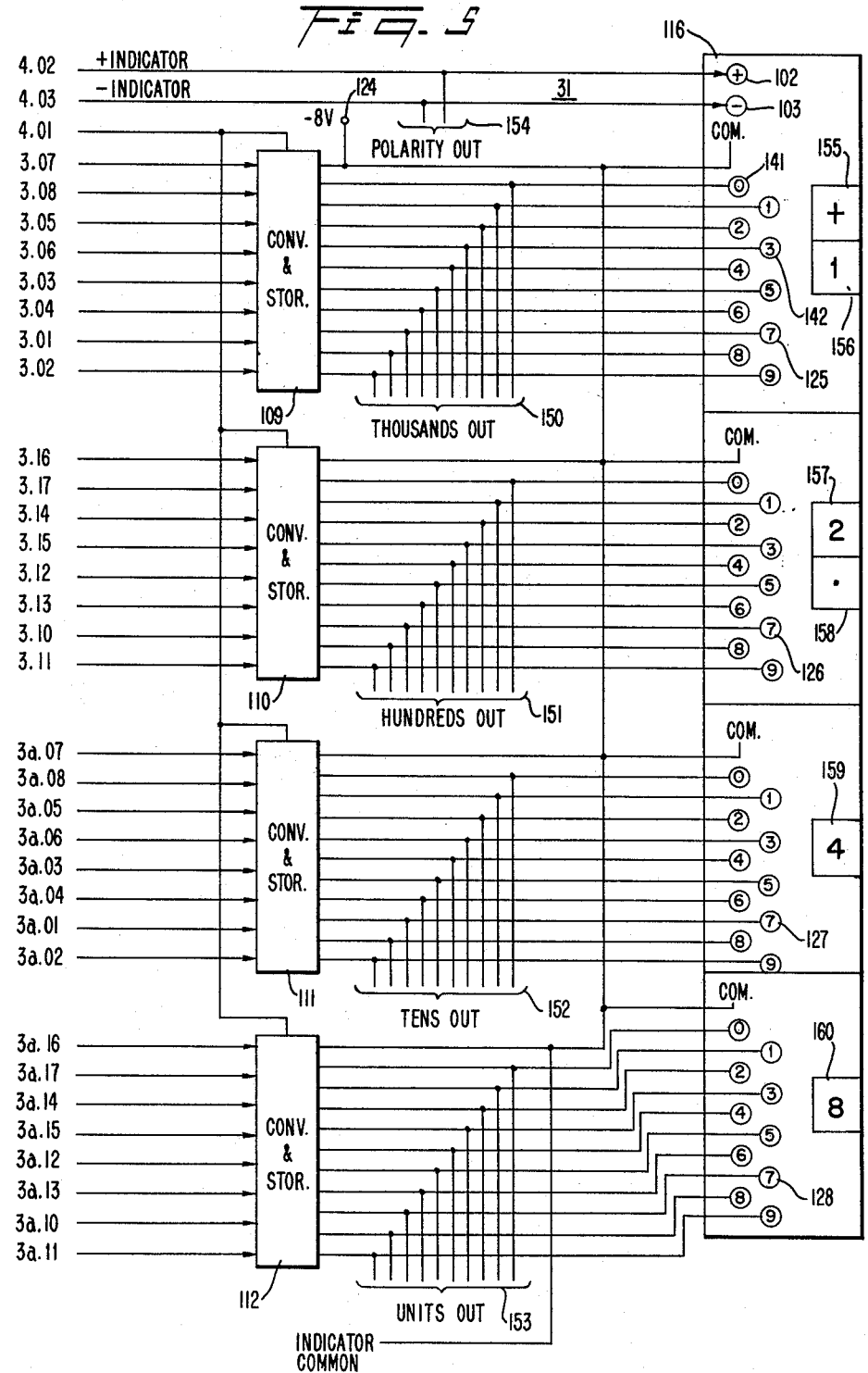

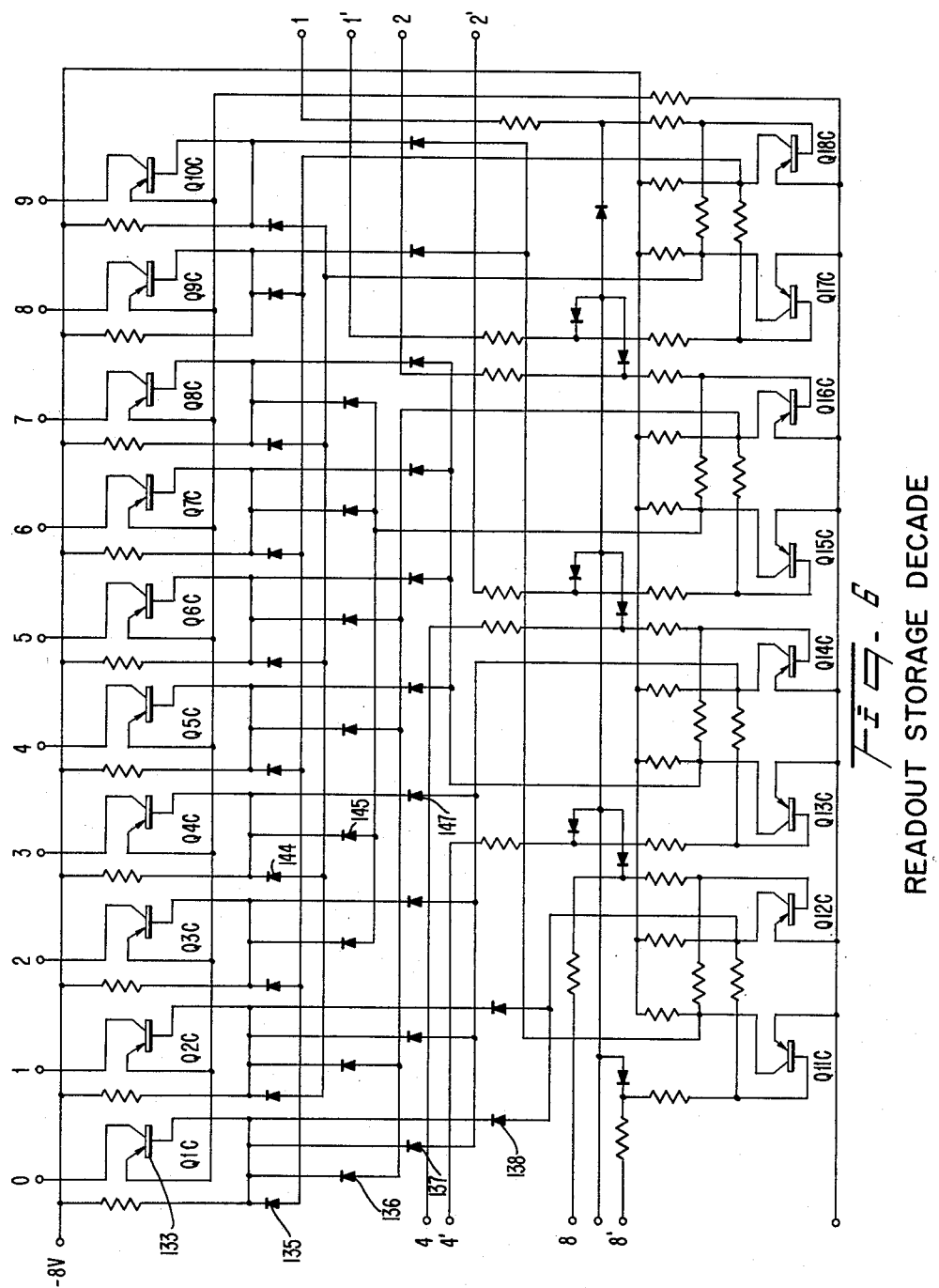

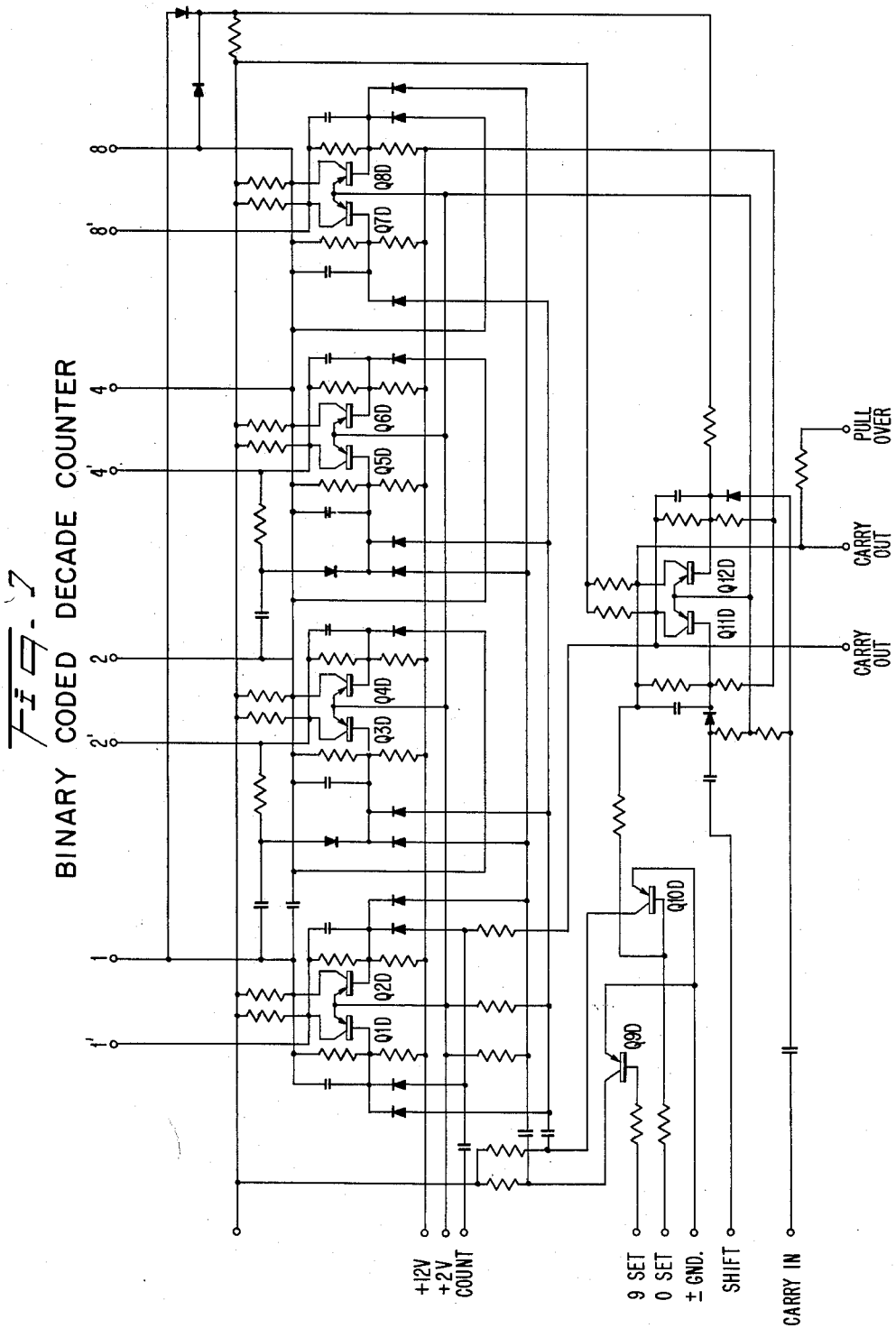

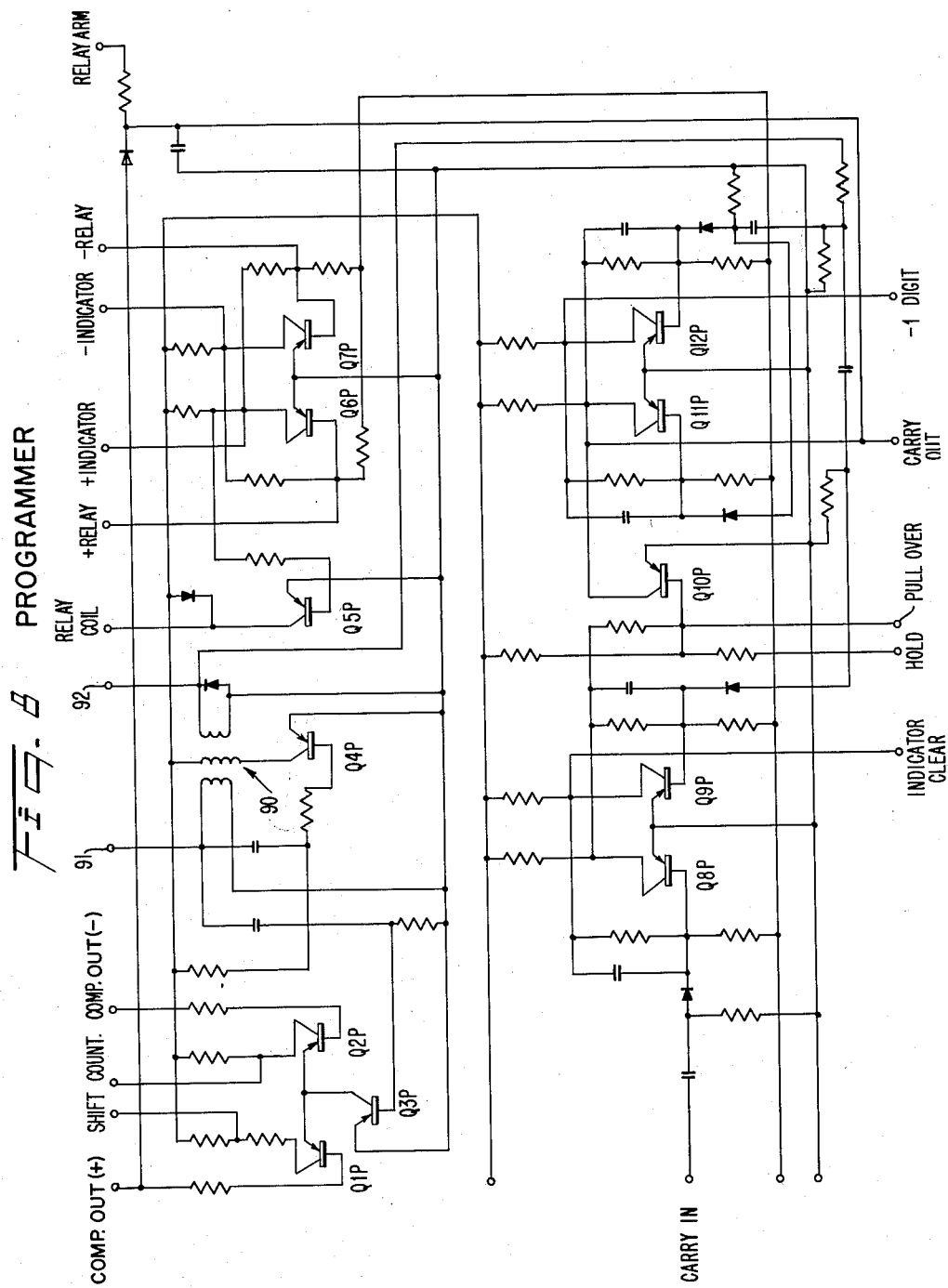
Fig. 8 PROGRAMMER

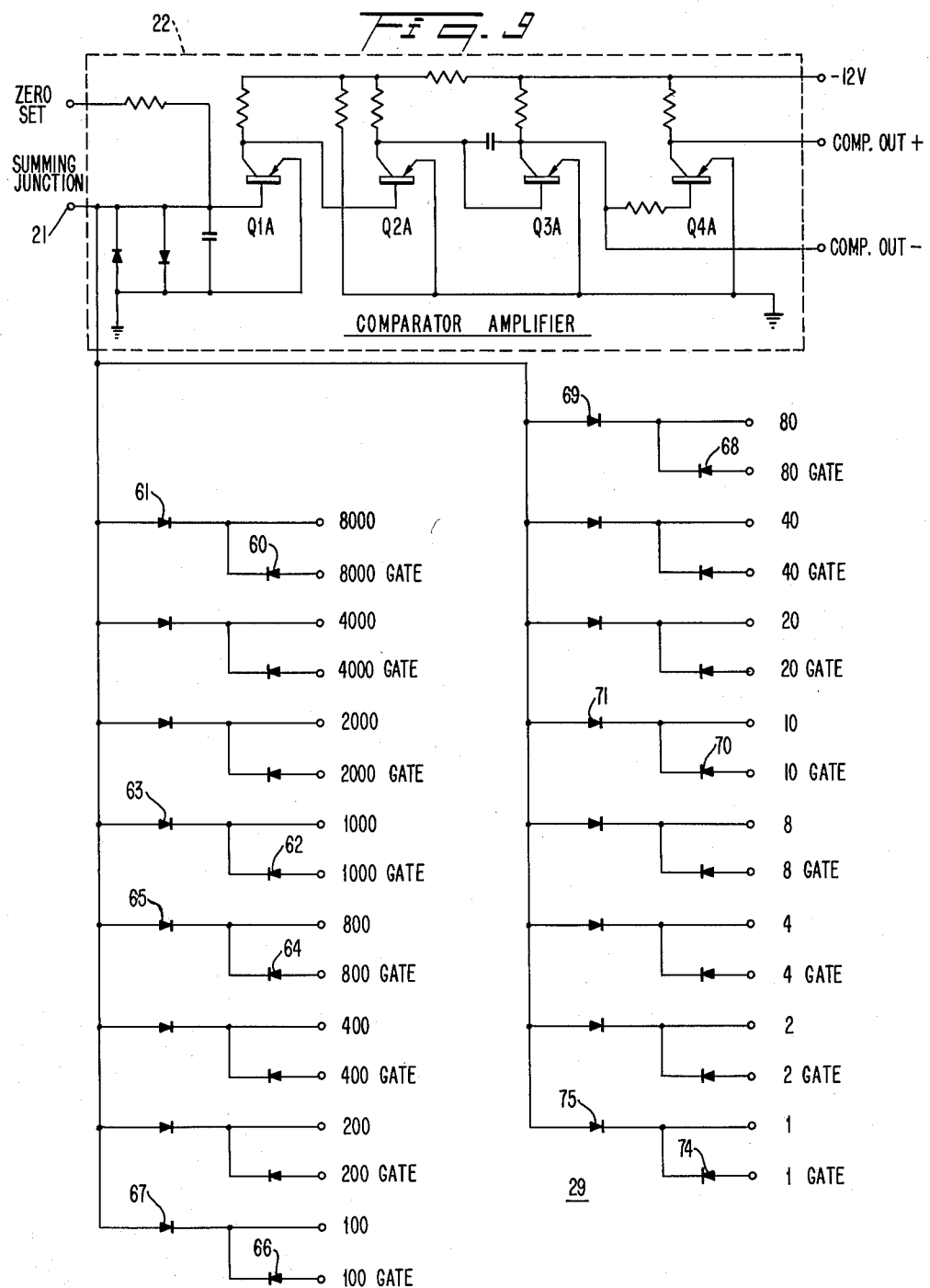

United States Patent Office 3,124,794
Patented Mar. 10, 1964

3,124,794
ELECTRONIC DIGITAL VOLTMETER
James R. Patmore, Neptune, N.J., assignor to Electronic Associates, Inc., Long Branch, N.J., a corporation of New Jersey
Filed Dec. 5, 1958, Ser. No. 778,364
10 Claims. (Cl. 340—347)

This invention relates generally to analog measurement and conversion to digits and more particularly to an analog-to-digital converter system.

An ever increasing practice in the handling of information is to convert the information under investigation, or information already gathered and existing as data whichever the case may be, into an electric voltage level and then contrast digital quantities therewith. This is particularly advantageous where the information or data under investigation is varying continuously, as for example where the information is representative of a variable physical quantity and it is desirable to present the information in readily usuable digits. The latter is desirable when computations are to be made on data since it saves the operator a conversion step from analog to digital values. This function is performed by analog-to-digital converters making it more easy and accurate to carry out computations requiring numbers.

Currently, conversion to digits systems are employed involving variations of three main different principles of operation. These are the following: *a*. Converting the input voltage to mechanical position of a code plate, *b*. Subtracting reference voltages in decreasing magnitudes from the input by use of relays, *c*. Comprising the voltage with a time varying reference in which the time varying reference is either generated electronically or by use of slide wires.

These known systems have several serious disadvantages. The code plate analog-to-digital converter is comparatively slow and its life is dependent on sliding contacts. The relay subtracting type system while having a higher speed than the code plate type does not lend itself to generation of arbitrary functions of input and the relay contact "life" is relatively short. The systems generating a time varying reference electronically are extremely complex and it is difficult to generate arbitrary functions. Those systems which generate a time varying reference by the use of slide wires have a limited life because of wear of the slide wires.

It is a principal object of the present invention to provide an analog-to-digital voltmeter or converter free of the limitations and disadvantages of the known systems.

Another object of the invention is to provide a very fast, highly reliable, long-lived analog-to-digital converter usable on a host of analog computer applications, and whose digital output can be visually displayed, or recorded by readout equipment such as a printer.

Still another object is to provide an analog-to-digital converter system which has a comparatively low noise circuit arrangement.

A feature of the analog-to-digital voltmeter according to the invention is the speed at which it converts to digits the analog input voltage. The speed of conversion is obtained by generating a variable reference signal by a process of continuous addition, and by contrasting this signal with an analog input voltage signal of unknown magnitude.

In its preferred form the present invention comprises means for generating or developing a variable reference signal which is coded in binary notation, and which, upon initiation of a conversion operation, is set to an initial condition of disagreement with the analog input signal. The reference signal may correspond to a current signal coded in a binary decimal code and suitable for comparison with a current signal corresponding to the unknown voltage signal. The reference signal generating means comprises binary-coded decade counters which responsive to command instructions vary the reference signal by increasing it in magnitude in predetermined increments. The decade counters control diode gates which are coded, for example, in a predetermined binary decimal code having a predetermined code progression and represent the reference signal as a digital count of predetermined digital steps. The count at each decade counter corresponds to a decimal step in the digital count and each decimal step corresponds to a decimal column in an unknown number to which the unknown input voltage signal corresponds.

A comparator is provided to contrast the input signal and the reference signal and to supply an output signal indicative of agreement or disagreement between the polarity, magnitude or value of the reference and input signal. This output signal is applied to a programmer which responds thereto and provides signals corresponding to the command instructions being applied to the decade counters for varying the magnitude of the reference signal. The reference signal is thus varied continuously from the initial condition of disagreement by increases in magnitude in predetermined increments until complete agreement is obtained between the input and reference signals. At the time of complete agreement between the signals, the programmer instructs or commands the generating means to cease varying the reference signal.

In the initial condition of disagreement between the input signal and the reference signal, the decade counters corresponding to the least significant decimal steps are set to their most significant digital count. The decade counter corresponding to the most significant decimal step is, however, set to its least significant digital count. Thus, in response to signals from the programmer, the magnitude of the digital count in the most significant decimal step is first increased to agreement. The next significant decimal step is then set to its least significant digital count and increased in magnitude until agreement is obtained. Each next significant decimal step is set to its least significant digital count upon agreement in the previous more significant decimal step. Finally, the least significant decimal step is set to its least significant digital count and thereafter increased in magnitude in predetermined increments until final agreement is obtained between the input signal and the reference signal.

A conversion device continuously receives the varying reference signal and stores it until complete agreement is obtained between it and the unknown input signal. At the time that agreement is obtained in the least significant decimal step the conversion device receives instructions from the programmer to convert the reference signal to an equivalent decimal output. The conversion device continuously provides a visual display in magnitude-related digits of intervals of correspondence between the input and reference signals. The sign of the input signal is also displayed. Once the analog-to-digital converter indicates a reading, it is cleared for a new operational cycle for indicating or registering the new reading.

Other objects, features and advantages of the system will be better understood as described in the following description and appended claims, in conjunction with the accompanying drawings which illustrate, by way of example, a preferred embodiment of the system, and in which FIG. 1 is a simplified block diagram of the analog-to-digital converter system according to the invention;

FIG. 1*a* is a block diagram of a comparator and diode gate according to the invention;

FIG. 2 is a block diagram of a programmer according to the invention;

FIGS. 3 and 3*a* are block diagrams of binary coded decade counters according to the invention;

FIG. 4 is a schematic diagram of a part of the readout indicator circuitry, the binary-to-decimal converter and the indicator unit of the system, according to the invention;

FIG. 5 is a diagram of the readout circuitry for carrying out the conversion function of the binary-to-decimal converter and indicator unit according to the invention;

FIG. 6 is a schematic diagram illustrative of an embodiment of a readout storage decade shown in FIG. 5;

FIG. 7 is a schematic diagram illustrative of an embodiment of the binary-coded decade counters shown in FIGS. 3 and 3a;

FIG. 8 is a schematic diagram illustrative of an embodiment of the programmer shown in block form in FIG. 2;

FIG. 9 is a schematic diagram illustrative of an embodiment of the comparator amplifier shown in FIG. 2;

FIG. 11 is a signal schematic diagram of a binary-coded decade counter according to the invention.

It is to be understood that the term "analog" is employed in this disclosure to mean analogous to some other thing, but it is not limited thereto and can mean simply "not digital." Moreover, the invention is concerned primarily with a voltage converter system or electronic digital voltmeter wherein the input is an unknown voltage signal representative of a physical quantity of unknown magnitude and the input is therefore also representative of an unknown number. The analog-to-digital converter according to the invention will first be described generally with the method of operation thereof in order to allow of better understanding of the detailed description that follows.

*General Method of Operation*

Figure 1:
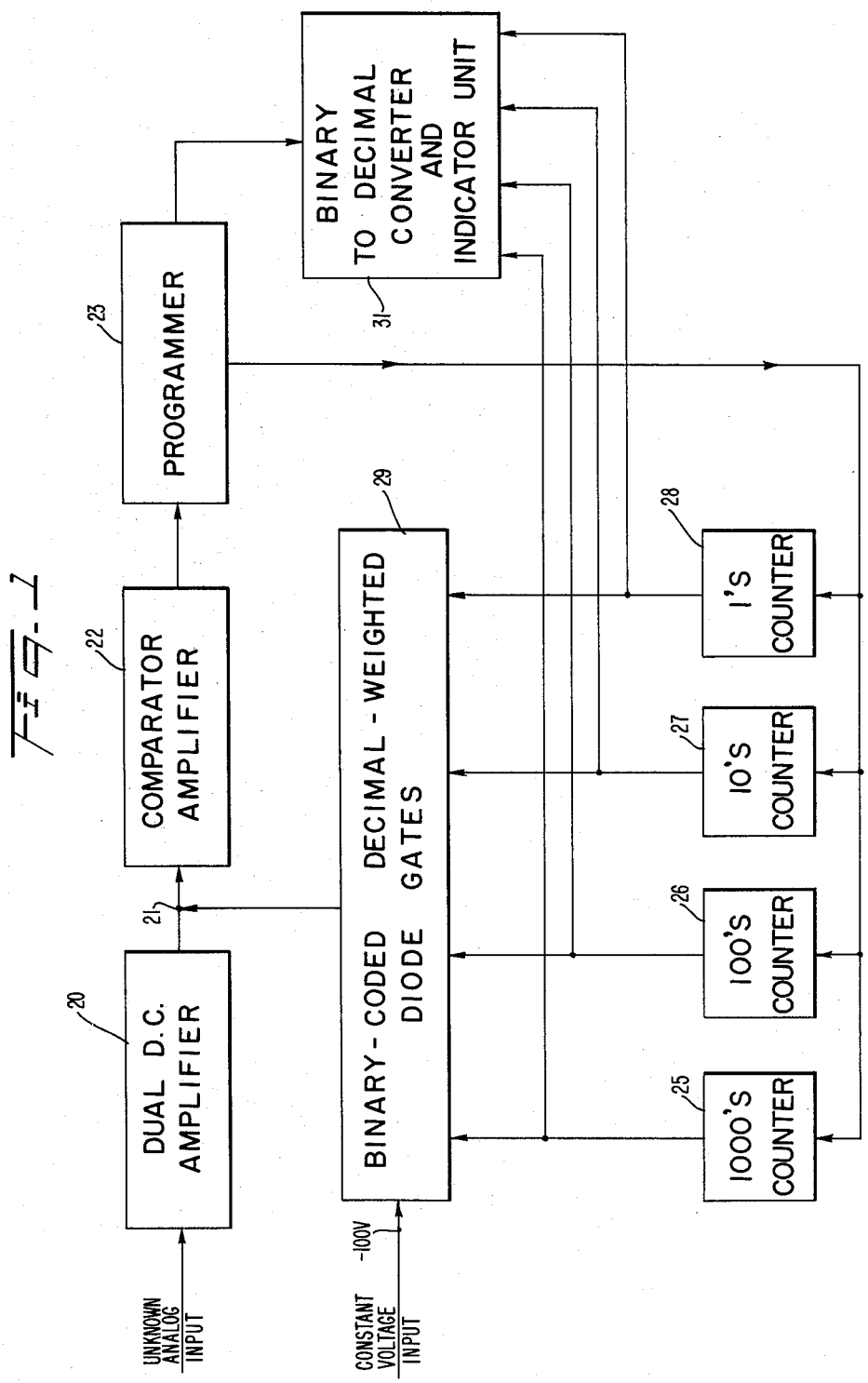
Figure 1D:
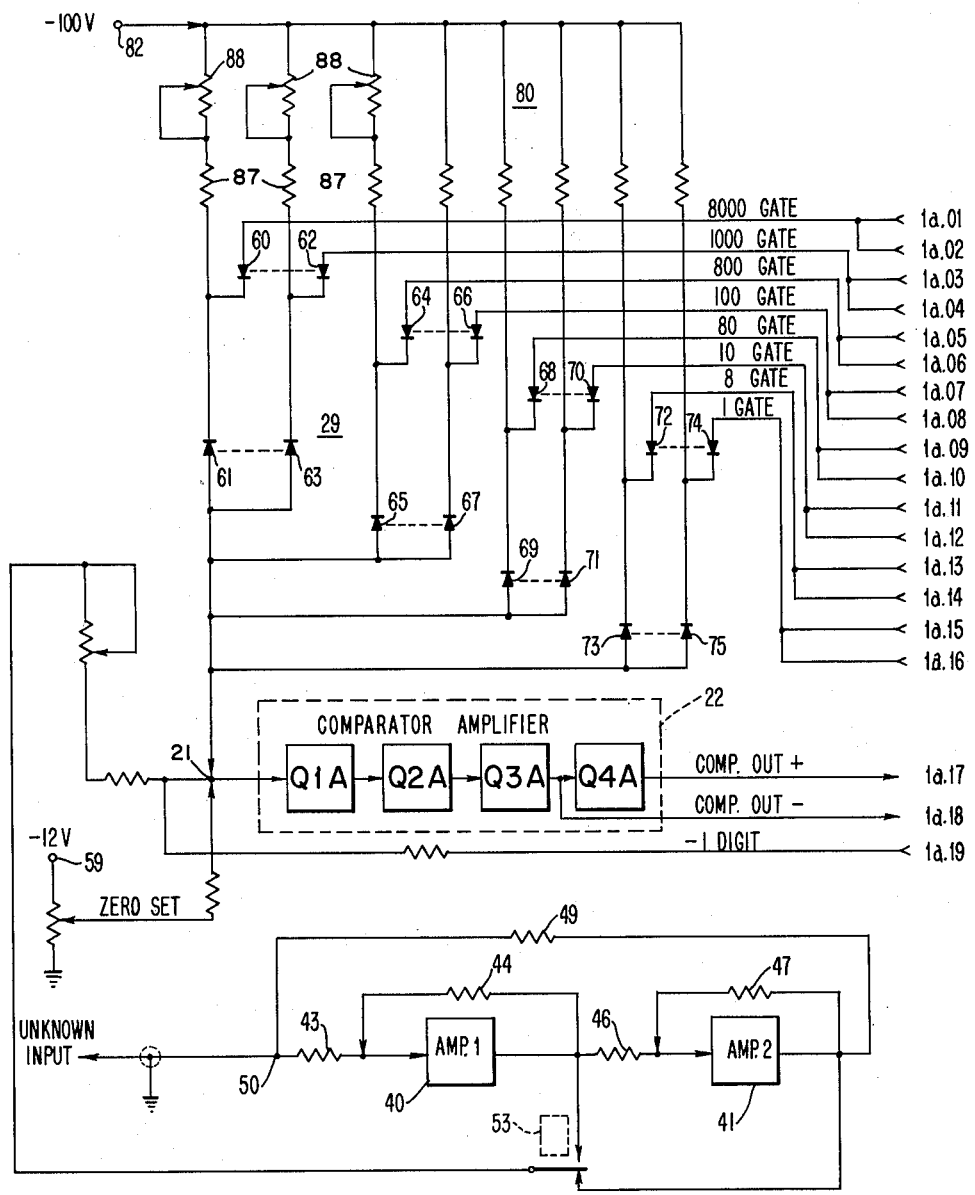

Referring to FIG. 1, which is a simplified schematic diagram of the converter system, an unknown anlog input voltage signal is applied to a dual D.C. amplifier 20 as shown. The output of the amplifiers is applied to a junction point 21 leading to the input of a comparator amplifier 22. It is at the junction point that comparison between the input signal and the reference signal actually takes place as later herein described. Beginning at junction point 21, a closed loop can be traced through the comparator amplifier 22, a programmer 23, decade counters 25-28, and through binary-coded decimal-weighted diode gates 29 to the junction point 21. This loop has a constant voltage, such as —100 v., applied as shown and is adapted to generate and control a test or reference signal, more correctly a test or reference current, for application applied to the junction point 21. This reference signal is adjusted by the diode gates 29 to equal the current due to the unknown voltage.

The comparator 22 compares the two currents and supplies an indication of agreement or disagreement to the programmer 23. The programmer accepts the information and governs the operation of a plurality of counters, only four shown at 25-28 accordingly. That is, if there is disagreement and the unknown input voltage is greater than the reference signal, the programmer will instruct a counter to count up. If the reference signal is greater than the input, a new counter will be selected. This process continues until there is complete agreement between the reference signal and the input signal. At the time of agreement the programmer instructs the counters to stop operation. In general, the programmer governs the operation of the analog-to-digital converter system or electronic digital voltmeter according to the invention.

The four counters 25-28 shown in FIG. 1 and labelled 1's, 10's, 100's and 1000's correspond to the four decimal steps or columns of a four digit number. Actually, each counter is a four stage binary-coded decade counters which delivers pulses in proper sequence along 1, 2, 4 and 8 lines, as hereinafter described, to the diode gates 29. During the counting operation, pulses are first delivered along a "1" line (to correspond to the decimal one), next along a "2" line (to correspond to the decimal 2), next along the "1" and "2" lines (to correspond to the decimal "3" since 1+2=3), and so on up to 9. The output of the decade counters is applied to a binary-to-decimal converter and indicator unit 31 where it is displayed as digits, magnitude-related to the unknown input.

The diode gates 29 are semi-conductor components, as later described, functioning as switches. They receive their instructions from the counters. The diode switch currents are weighted in binary form and applied to the junction point 21 in a manner later herein described.

The indicator unit 31 performs two functions: namely, first it accepts and stores binary data describing the unknown analog voltage under test, and second it converts, under control of the programmer, the binary data to a decimal equivalent and displays it and the sign of the unknown input continuously on a readout panel. If desired, the indicator unit can be made to provide a third function of supplying decimal information to a mechanical printer, not shown.

In examining what happens when a new reading is to be taken by the instrument, first assume that an old number is already displayed and that the new unknown voltage has a value of +12.48 volts. At the moment that a new voltage or number is detected by the comparator amplifier, the programmer develops an instruction signal which sets all of the binary counters to their least significant digital count or zero.

After this, the programmer checks the polarity of the unknown voltage and informs the indicator unit 31 of its sign. Simultaneously, relay means are actuated within the comparator amplifier 22 to apply only a positive polarity signal of the proper magnitude to the programmer 23. Thus, even though the input voltage may have a negative polarity, the programmer 23 will see only a positive voltage of the proper magnitude.

The programmer next establishes a test signal, which in the present embodiment may correspond to 09.99 volts, by setting the binary counters to this count. That is, the 1000's counter is set to its least significant count or zero, and the remaining counters are set to their most significant count so that they are sending pulses along their corresponding 8 and 1 lines (8+1=9). This test voltage is then contrasted with the unknown input.

Immediately the comparator detects the disagreement between the two voltages. The programmer detects that the unknown voltage is of a greater magnitude and instructs the 1000's counter to start counting up. At the first count, the test voltage is changed to 19.99, a greater magnitude than that of the input voltage. The comparator detects this disagreement and the programmer, in turn, causes the 100's counter to be set to zero, its least significant count. The test voltage now becomes 10.99, and the comparator informs the programmer that the test signal is too low. The 100's counter is instructed to start counting up, and it does so in predetermined steps until the test voltage corresponds to a voltage of 12.99.

The test voltage is now greater than the unknown voltage. The comparator passes this information along to the programmer which causes the counting operation to be shifted to the 10's counter. This unit is set to zero, its least significant count, so that the test voltage now corresponds to 12.09, which is less than the magnitude of the unknown voltage. The programmer detecting this disagreement at once instructs the 10's counter to start counting up until the test voltage becomes 12.49.

The programmer, recognizing that the test voltage is once again greater than the unknown, shifts the counting operation to the 1's counter. The 1's counter is set to zero, its least significant count, the reference voltage is seen to correspond to 12.40, and the programmer detecting this disagreement instructs the 1's counter to count up. At the count of 8 at the 1's counter, the test voltage is seen to correspond to 12.48 which exactly matches the unknown input. The comparator can no longer detect any difference between the input signal and the reference signal and the reading operation is now complete. The programmer now instructs the indicator unit to change the visual indication to correspond to the new input signal, +12.48.

The instrument of the present invention then goes through another cycle of operation as previously described, and so long as the input remains the same, the digits displayed by the indicator unit remain unchanged. The length of time required for a cycle of operation is determined by a blocking oscillator to be described. In one operative model of the present invention, all of the previously mentioned steps were seen to take place in less than 1/200 of a second.

Dual D.C. Amplifier

Figure 3:
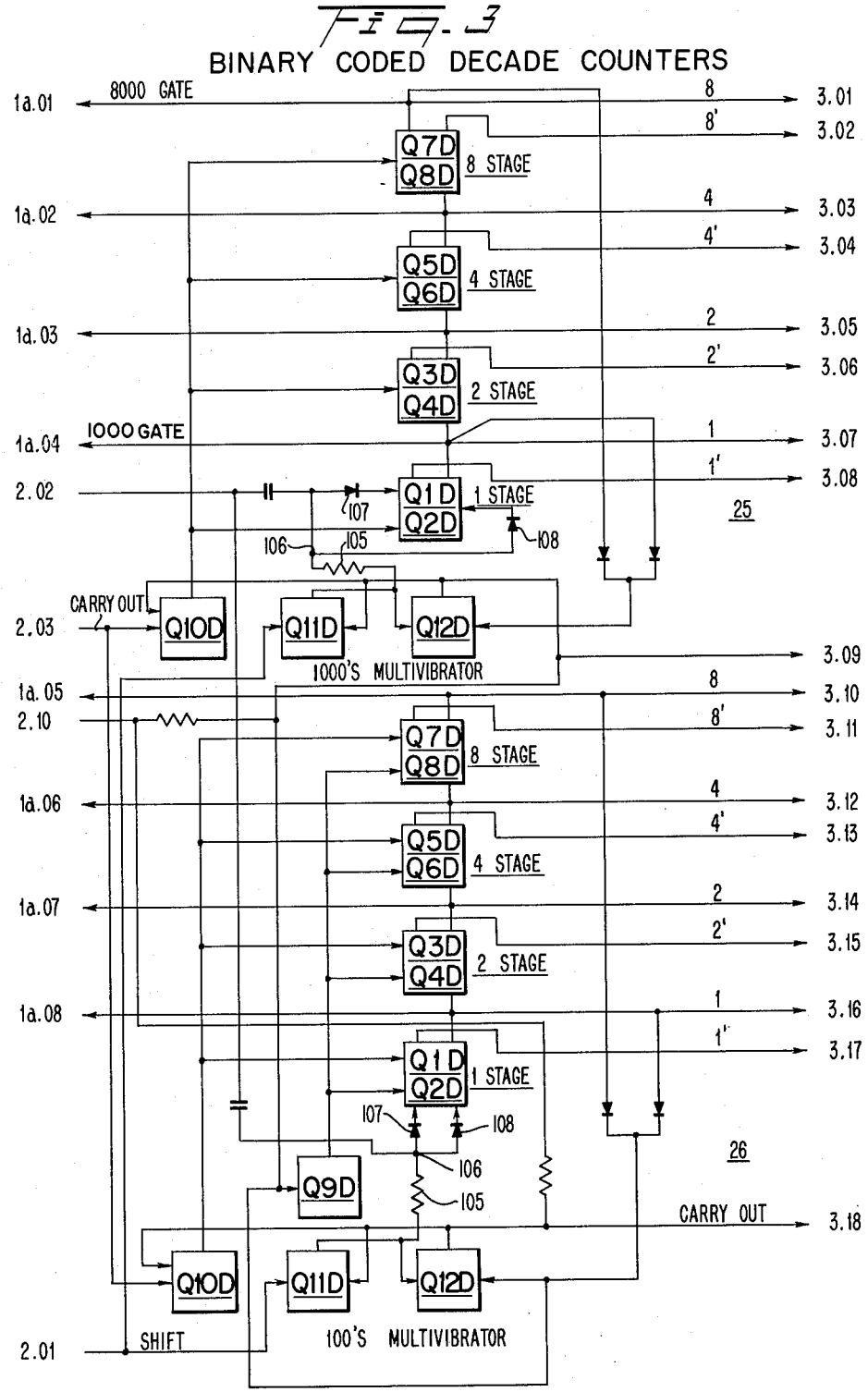

FIGS. 1a–5 form a detailed block diagram of the electronic digital voltmeter shown in FIG. 1. The figures show the individual circuits in block form and the interconnection between individual circuits. The individual circuits within each block form may conveniently comprise a plug-in unit. The interconnection between units are designated with three or four digit reference numerals so that the circuits can be easily traced from one circuit within a plug-in unit to another circuit in another, or several other plug-in units. The connections originating in each figure are designated with a reference numeral beginning with a digit corresponding to the figure. For example, connections originating in FIG. 1a are designated 1a.01 through 1a.19, those in FIG. 2 are designated 2.01–2.10, those of FIG. 3 are designated 3.01–3.18, those of FIG. 3a are designated 3a.01–3a.16, and those of FIG. 4 are designated as 4.01–4.03. The respective interconnections when shown in related figures, connected to another or several units, are similarly designated. Moreover, specific connections through which certain operations are affected are designated with specific and appropriate legend.

Referring to the detailed block diagram (FIGS. 1a–5) of the system, the dual D.C. amplifier 22 of the system is shown to comprise two conventional direct coupled amplifier sections 40, 41. An input resistor 43 and a feedback resistor 44 are provided for the first amplifier section 40, and the values of these resistors are so chosen that the input voltage to the amplifier is multiplied by a factor of 1.25. The second amplifier section 41 is provided with an input resistor 46 and a feedback resistor 47 so chosen that the input voltage fed to this amplifier is multiplied by a factor of one. A resistor 49 is connected in shunt with both amplifier sections. As is well known, there is a 180° phase reversal through each amplifier. The output voltage from the second amplifier section 41 is in phase with the unknown input voltage and 25% greater in magnitude. The value of a feedback resistor 49 across both amplifiers is, for example, 25,000 ohms. A small current, corresponding to the 25% by which the second amplifier output exceeds the unknown voltage, is always fed back through resistor 49 to an input or summing point 50 of the first amplifier section 40. This feedback current cancels the input current and since the feedback network greatly increases the input impedance of the instrument, current loading of the analog input source is prevented.

The output from each amplifier section is connected to the stationary contacts 53.1, 53.2 of a relay 53 as shown. The operation of this relay 53 is governed by the polarity of the unknown input voltage, and is so arranged that a positive voltage, corresponding to the magnitude of the unknown voltage, is always applied to the comparator amplifier 22 after the completion of a sign check operation.

Comparator and Diode Gates

The comparator amplifier 22 is composed, FIGS. 1a and 9, of four cacaded transistor stages of amplification Q1A–Q4A. FIG. 9 is a schematic diagram illustrative of an embodiment of the comparator amplifier 22 and diode gates 29 according to the invention. Two signal output lines 1a.17, 1a.18, FIG. 1a, are provided for this amplifier and are labelled "comp out +" and "comp out −" respectively. If the known current, i.e., that which is produced by the reference voltage, the generation of which is later herein explained, is greater than that produced by the unknown voltage, −10 v. will be present on the "comp out +" line and zero volts will be present on the "comp out −" line. Siimlarly, if during a sign check step, later herein explained, the unknown voltage is negtaive, these same line conditions will exist. In a third condition, namely, if the unknown current is greater than the known, −10 volts will appear on the "comp out −" line and zero volts will appear on the "comp out +" line. If the unknown voltage is positive during the sign check step, −10 volts and zero volts will appear on the "comp out −" and "comp out +" lines respectively. The output voltage on either line 1a.17 or line 1a.18 is always either −10 volts or zero volts because transistors Q3A and Q4A are always either saturated or completely cut-off. The transistors Q1A–Q4A are so arranged that transistors Q1A and Q3A conduit to saturation when transistors Q2A and Q4A are cut-off. Similarly, transistors Q2A and Q4A conduct to satuartion when transistors Q1A and Q3A are cut-off. The condition of these transistors is determined by the direction of current flow into the transistor Q1A.

The junction point 21, where the actual comparison of the input and reference signals takes place, is shown in FIG. 9 to be tied directly to transistor Q1A, the first amplification stage of comparator amplifier 22. Junction point 21 is further tied directly to diode gates 29, a source of "zero set" voltage 59, a "−1 digit" line 1a.19, and the output terminals of amplifier sections 40, 41 via a movable pole 53.3 of relay 53. The "zero set" voltage determines the 00.00 point of the instrument and is adapted to apply a small constant current to the junction point 21.

The diode gates 29 comprise odd- and even-numbered diodes, shown at 60 through 75, which function as switches for the resistors in a summing resistor network 80. There are four groups of odd- and even-numbered diodes within the diode gate unit 29 shown in FIG. 1. Each diode group corresponds to a decimal column of position (1,000's, 100's, 10's, and 1's) of a four digit number. In order to simplify the drawings, only the first and last diode components of each group are shown on the block diagram. Thus, diodes 60–63 correspond to a first group, diodes 64–67 correspond to a second group, and etc. Each odd-numbered diode has its cathode tied to one side of a summing resistor within the network 80. A constant voltage, such as −100 v., is applied at 82 to the other side of each of the summing resistors. The anodes of these diodes are connected to the junction point 21 which is maintained at ground potential. Normally the diodes would conduct; this is, however, prevented by the even-numbered diodes or semi-conductors. These even-numbered semi-conductors have their cathodes connected to the resistors in network 80, but their anodes are connected to binary decade counters 25 through 28 (FIGS. 1a, 3 and 3a). In order to simplify the disclosure and drawings the counters have like reference numerals for designating like elements.

Turning now to the schematic diagram of FIG. 7, illustrative of an embodiment of a binary counter, the anodes of the even-numbered diodes in gate 29 are connected according to their weight to the collectors of even-numbered transistors Q2D, Q4D, Q6D, and Q8D which form part of a bistable multivibrator circuit for each binary position. Whenever these transistors are conducting, a small positive voltage is applied to the anodes of the corresponding even-numbered diodes causing them to conduct. Thus, current flows through the summing resistors of network 80, through the even numbered diodes and to the binary coded decade counters. Whenever any of the even-numbered transistors Q2D, Q4D, Q6D, and Q8D are nonconducting, a negative voltage is applied to the anodes of the corresponding even-numbered diodes causing them to be cut-off. Thus, current flows through the corresponding odd-numbered diodes of diode gate 29 to the junction point 21. Hence the even-numbered diodes act as switches for the odd-numbered diodes and either bypass current through the decade counters or allow current to flow into the junction point 21.

*Summing Resistor Network*

The summing resistor network 80 consists of a plurality of resistors across which a basic reference voltage, such as −100 v. is applied. The resistors are divided into four groups of four each so that there are a total of 16 resistors. Each group represents a decade of a four-digit decimal number. That is, one group represents the units portion of the decimal number, another group represents the tens portion, another group the hundreds portion, and the fourth group represents the thousands portion. However, only the first and last component of each group is shown on the block diagram of FIG. 1a. The resistance value of the resistors in each group is so ratioed that the highest resistor is eight times the lowest, the next greatest is four times the lowest, and the second greatest is twice the lowest to correspond to the 8, 4, 2, 1 binary code, and thus the gates are formed and labelled. Certain of the resistors 87 are padded by a second variable resistance component 88 connected in series as shown.

The reference voltage produces current through each resistive element in proportion to its value. Thus, binary-coded currents are produced. Current is continuously flowing through the resistors and the gates are formed as labelled (1 Gate–8000 Gate). As is apparent, the power handling ability of the smaller resistors is greater than the power handling ability of the larger resistors.

*Programmer*

Much of the circuitry of the binary decade counters will be described in conjunction with a description of the programmer that follows. In order to simplify the drawings, the elements of the counters are similarly numbered since they are similarly constructed.

As previously mentioned, one of the functions of the programmer 23 is to control the counting order to be pursued by the binary-coded decade counters 25–28. In this invention the 1000's counter counts first, then the 100's counter and so on down to the units counter. To carry out this function, there is provided a blocking oscillator 89, FIG. 2, a double "and" circuit and a distributor. The distributor may take the form of a shift register or ring counter.

The blocking oscillator 89 shown on the detailed block diagram, FIG. 2, consists of a transistor Q4P and a transformer 90 shown in FIG. 8. The reference numerals 91, 92, FIG. 2, correspond to similar terminals at the transformer 90. Negative-going pulses are derived from terminal 91 and positive-going pulses are obtained from terminal 92. The oscillator is free-running at a suitable rate, such as 4,000 cycles per second. This rate is not critical, and several hundred cycles either above or below this value is perfectly satisfactory. The signal output from the blocking oscillator 89 is delivered to the previously mentioned double "and" circuit as well as to a sign check multivibrator and an indicator clear multivibrator.

The double "and" circuit is comprised of transistors Q1P, Q2P and Q3P with transistor Q3P being connected to both transistors Q1P and Q2P. Shift pulses are derived from the transistor Q1P over the "shift" line 2.01 while count pulses are derived from the transistor Q2P over the "count" line 2.02. Pulses appear over either the "shift" line or the "count" line but not over both lines simultaneously. The negative pulses from the blocking oscillator 89 are applied to transistor Q3P. A negative voltage must be present on either the "comp out −" line or the "comp out +" line before either transistor Q1P or Q2P can conduct. If the "comp out −" line is negative, positive going pulses will be applied on the "count" line 2.02. If the "comp out +" line is negative, positive going pulses will be applied in the "shift" line 2.01.

The distributor comprising a shift register or ring counter is located in part at each of the counters 25–28 as well as at the programmer 23. The distributor circuit located at the programmer, FIGS. 2 and 8, comprises a sign check multivibrator consisting of transistors Q11P and Q12P, an indicator clear multivibrator consisting of transistors Q8P and Q9P and a pull-over inverter formed by a transistor Q10P. Transistors Q11D and Q12D, located at each of the four binary-coded decade counters, FIGS. 3 and 3a, comprise the rest of the distributor circuit. With the exception of the pull-over inverter Q10P, all elements of the distributor are in the form of bistable multivibrators.

When one transistor in a multivibrator group is conducting, the other transistor is cut-off. These conditions remain unchanged until a shift pulse is received from the double "and" circuit. The initial condition for each bistable multivibrator at each of the counters is for the odd-numbered transistor Q11D to be in the non-conducting state. At the programmer, transistors Q9P and Q12P are in their non-conducting state.

When the converter system is first turned on, with zero signal input, the above conditions may not exist. However, since the reference signal has some magnitude which must be greater than the magnitude of the input signal, the comparator amplifier 22 will deliver −10 volts on the "comp out +" line. With this output from comparator amplifier 22, the double "and" circuit will deliver shift pulses to the odd-numbered transistor Q11D in each of the binary-coded decade counters, later herein fully described, which sets each multivibrator within the distributor to the initial condition described.

The distributor function begins with the sign check multivibrator comprising of transistors Q11P and Q12P located at the programmer. Initially, transistor Q11P, is conducting and transistor Q12P is cut-off. Positive pulses from the blocking oscillator 89 are continuously applied to both sides of the sign check multivibrator, and as is apparent, this circuit should continuously oscillate at a rate determined by the blocking oscillator. The pull-over inverter Q10P, however, controls the sign check multivibrator and prevents continuous oscillation of same.

A sign check operation will now be described with reference to FIG. 10, which illustrates the signal sequence of the electronic digital voltmeter according to the invention. It will be understood that the first function carried out by the system is to set the counters 25–28 to zero and check the sign of the unknown voltage. This is illustrated by the stepped line at the top of the signal sequence diagram, FIG. 10, which displays the output voltage from the diode gates and the sign check multivibrator. At time zero the voltage from the diode gates is seen to drop to zero.

Figure 10:
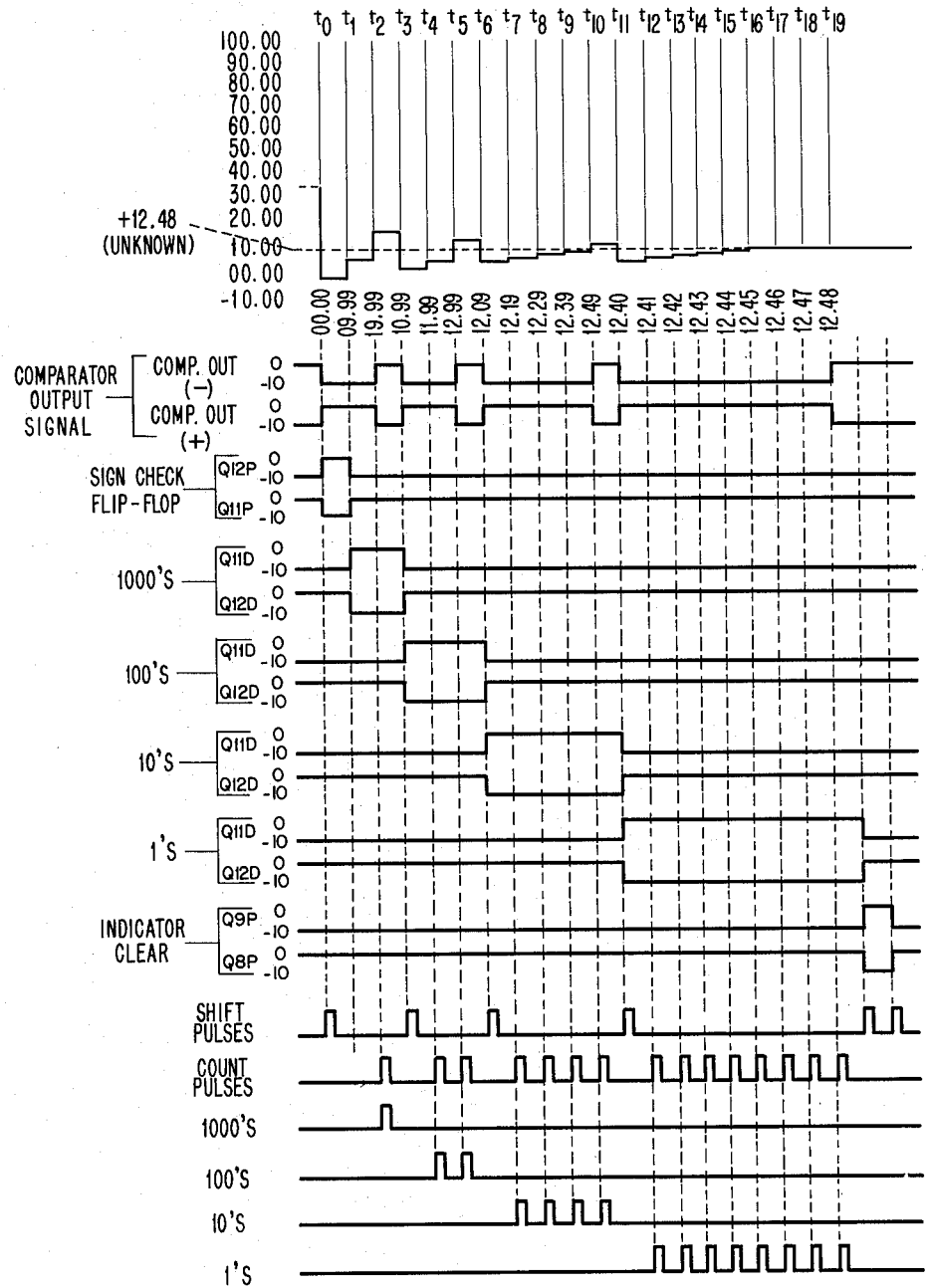
FIG. 10 is a signal schematic diagram for the system according to the invention.

Previous to time zero, as shown on FIG. 10, it is assumed that a reading of +35.32 volts is displayed by the system. In this condition, or as a matter of fact, in any condition of quiescence where a reading has just been arrived at and displayed, the "comp out +" line of comparator 22 is at −10 volts and the "comp out −" line is at zero volts. At time zero, when a "clamp" is removed from the carry out line of the sign check multivibrator, in a manner to be described, the comparator 22 is adapted to receive a new input signal. For purposes of illustration, it will be assumed that the new unknown input voltage has a value of +12.48 volts and that it is this value which is to be measured and displayed. Since the reference signal, +35.32, has a greater magnitude than the unknown signal, the voltage conditions on the comparator output lines remain the same.

It is to be understood that transistor Q11P is normally "clamped" to a condition where it is conducting and that in this condition transistor Q12P is in a condition where it is not conducting. In this quiescent or initial condition this "clamp" is removed and the sign check multivibrator is now in a condition to be triggered to its opposite state by the next subsequent positive pulse from the blocking oscillator 89. Upon occurrence of this positive pulse, the transistor Q12P is rendered conducting and transistor Q11P is cut-off, as illustrated on the signal schematic diagram, FIG. 10. The pulse produced by the conduction of transistor Q12P is the "—1 digit" pulse mentioned heretofore and it is so labelled on the detailed block diagram FIG. 2. This "—1 digit" signal is applied to the junction point 21 of the comparator amplifier 22 through line 1a.19.

It can be seen from the signal schematic diagram, FIG. 10, that transistor Q12P conducts only during the sign check; therefore, the "—1 digit" pulse is applied to junction point 21 only during the sign check time. The purpose of this pulse is to present a small negative signal to the comparator amplifier 22 which is of sufficient magnitude to prevent any noise from applying a false positive or negative signal to the comparator amplifier 22 and thus cause chatter of the relay 53. In this condition, with transistor Q11P non-conducting, a negative pulse is applied to a resistor 95 shown in FIG. 2. Resistor 95, together with a diode 97 connected to the "comp out +" line 1a.17, form an "and" circuit, FIG. 2, which is connected to a sign multivibrator comprising transistors Q6P and Q7P, through a movable pole 53.4 of relay 53. Stationary poles 53.5 and 53.6, which are adapted to cooperate with pole 53.4, are connected directly to the sign multivibrator, transistors Q6P and Q7P.

Referring to the sign multivibrator circuit for a moment, it will be seen that its output lines 2.04 and 2.05 are connected to the indicator unit shown in FIGS. 4 and 5 to energize transistors Q1C' and Q2C'. Transistors Q1C' and Q2C' in turn govern the energized condition of indicator lamps 102, 103. If the sign of the unknown voltage is positive, transistor Q6P is cut-off and transistor Q7P is conducting. If the sign of the unknown voltage is negative, transistor Q6P is conducting, and transistor Q7P is cut-off. The output lead 2.04 from transistor Q6P is also connected to a relay amplifier, transistor Q5P. Transistor Q5P is rendered conducting or non-conducting in response to the conducting condition of transistor Q6P, and when it is in the conducting state, it causes energization of the relay 53.

If the "comp out +" line connected to transistor Q1P is negative at the instant that the transistor Q11P is triggered to a non-conducting state, a negative signal will be applied to the movable pole 53.4 of the relay 53. This signal can go in either one of two directions depending upon the state of the relay. That is, it can be applied to either transistor Q6P or transistor Q7P depending upon which of the poles 53.5, 53.6 the pole 53.4 engages. In our example, no negative signal will appear on the "comp out +" line 1a.17, no signal is applied to the relay pole 53.4 and therefore plus sign indicator lamp 102 continues to burn. However, if in the present condition the unknown signal were negative, —10 volts would appear on the "comp out +" line 1a.17 and a negative pulse would be applied to the transistor Q6P. Transistor Q6P would conduct, relay amplifier Q5P would be cut-off, and the relay coil 53 would be energized. Poles 53.3 and 53.5 would engage stationary poles 53.1 and 53.6, and as is apparent, a positive signal representative of the unknown voltage would be applied from amplifier 40 to summing junction 21. Moreover, transistor Q7P would be cut-off to energize the negative sign indicator lamp 103.

Refer now to FIG. 2 and more specifically to the sign check multivibrator comprising transistors Q11P and Q12P. This multivibrator circuit is in the beginning of the distributor and its output line 2.03 is labelled "carry out" and comes from the collector of transistor Q11P. This line feeds "0 set" transistors Q10D at each of the binary-coded decade counters 25–28 as well as a "carry in" or "9 set" multivibrator, not shown.

The "0 set" circuit of each counter, in effect, clears all counters of old numbers held therein by applying the same potential to one side of all the counting multivibrators comprising transistors Q1D–Q8D. Thus, all counters are set to zero, their least significant count, at the beginning of the sign check signal.

The "carry in" or "9 set" multivibrator, not shown, derives a negative "carry out" pulse in response to the negative "carry out" signal obtained at the collector of transistor Q11P and applies it to the 1000's multivibrator at transistor Q12D. This pulse reverses the state of this circuit so that transistor Q11D is once again conducting and transistor Q12D is once again cut-off, as shown on the signal schematic diagram. Thus, there exists a positive-going signal in the collector circuit of transistor Q11D with a corresponding negative-going signal in the collector circuit of transistor Q12D as can be seen in the signal schematic diagram. The negative-going signal applies a necessary "pull-over" signal to the pull-over inverter Q10P at the programmer and causes transistor Q11P of the sign check multivibrator to be "clamped" or held in a conducting state. In addition to providing the "pull-over" signal, the negative "carry out" signal from transistor Q12D at the 1000's counter will be applied to a "9 set" transistor Q9D at each of the 100's, 10's, and 1's counters, as well as to the transistor Q12D at the 100's multivibrator. Thus, the "carry out" signal from the 1000's binary-coded decimal counter 25 is used to trigger a test or reference voltage of 09.99 as indicated on the signal schematic diagram. This "carry out" signal as applied to transistor Q12D at the 100's counter is of the wrong polarity to trigger the 100's multivibrator to its opposite state. Moreover, the "carry out" signal from the 1000's multivibrator biases the diodes 107, 108 at the 1000's counter to a condition to enable the counter 25 to respond to count pulses obtained from transistor Q2P.

Thus, to recapitulate, it is seen that the following events have taken place at the time $t_0$: (1) a new voltage was sensed at the comparator; (2) the polarity of this new voltage was checked and appropriately displayed at the indicator unit; (3) the sign relay was appropriately switched to apply a positive polarity signal to the comparator; (4) the binary counters were cleared of their old numbers by being changed to indicate their least significant digital count; and (5) all but the most significant decimal decade of the binary counters is set to their most significant digital count.

A reference signal corresponding to the count of 09.99 is applied to the comparator amplifier 22 through the diode gates. The comparator amplifier 22 recognizes that this reference signal is too small or less than the input signal. Thus, the negative signal remains along the "comp out —" line 1a.18 to transistor Q2P of the programmer 23. Upon occurrence of a pulse from oscillator 89, a count pulse is delivered to the first binary stage, transistors Q1D, Q2D, of each counter. This count pulse, however, only acts upon the 1000's counter 25 because of the state of its multivibrator. Thus, the 1 stage multivibrator of this counter is turned on; all of the others remain off. At the count of 1 the test voltage is seen to correspond to 19.99 and to be of a greater magnitude than the unknown signal.

The comparator 22 recognizes this fact of disagreement, and the voltage conditions are reversed on the line 1a.17 and 1a.18. The voltage conditions at transistor Q1P are now such that at the occurrence of the next oscillator pulse, at time $t_3$, a shift pulse will be applied on the "shift" line 2.01 to all of the multivibrators at the counters. However, only the 1000's multivibrator of counter 25 is affected because it is conducting while the others are not. Transistor Q12D at counter 25 will return to its conducting state and transistor Q11D thereat will be cut-off. In reverting to this condition, a positive "carry out" pulse will be applied to transistor Q12D at counter 26. The multivibrator at counter 26 will reverse its state and bias the diodes 107, 108 to a condition where the counter will be responsive to count pulses received from transistor Q2P. This "carry out" pulse is also applied to the "0 set" circuit transistor Q10D at counter 26 to set the "1" and "8" stages to zero, the least significant count. As indicated on the signal schematic diagram at $t_3$, the test voltage is seen to be 10.99 or less than the unknown input signal.

The comparator amplifier 22 sensing disagreement between the applied signals once again reverses its output signals on the lines 1a.17 and 1a.18 in accordance with the new information. The next pulse from the blocking oscillator 89 will now be fed out along the "count" line 2.02.

At time $t_4$ the oscillator pulse affect only the 100's counter 26 and causes the "1" counter or stage to be turned on. The test voltage now becomes 11.99 which is still less than the unknown voltage. The comparator amplifier does not change its output conditions so a second count pulse is delivered out along the "count" line to the 100's counter 26. Now the "2" stage is energized and the "1" stage is off. The test voltage becomes greater than the unknown. Thus, a shift pulse is generated to energize the 10's multivibrator which in turn sets the 10's counter to zero and readies the 10's counter counting circuits for operation. The next four succeeding count pulses from the blocking oscillator 89 cause the counter 27 to count up until the count in this decimal step is in agreement with the count or number in the corresponding decimal column in the unknown input.

The above process is repeated for the 1's binary-coded decade counter 28 until the unknown voltage and the test voltage are equal in each decimal column or step.

When no difference exists between the unknown and test signals the comparator amplifier 22 returns to its normal condition with zero volts along the "comp out —" line and —10 volts along the "comp out +" line. As remembered, in this condition a shift pulse is now applied to the counter multivibrators. Since only the 1's counter multivibrator is on, the shift pulse will shut it off and turn on the last stage of the distributor, the indicator clear multivibrator comprising transistors Q8P, Q9P. The action of this stage is indicated on the signal schematic diagram and a positive going pulse is seen to be applied along the "indicator clear" lines 2.08, 4.01 to the indicator unit 31.

Transistor Q8P momentarily disables the pull over inverter circuit transistor Q10P, which releases the "clamp" on transistor Q11P. The next subsequent shift pulse shuts off the indicator clear multivibrator and the distributor is seen to be in readiness to receive a new input signal.

*Binary Coded Decade Counters*

As previously pointed out, there are four binary-coded decade counter units 25–28 in the electronic digital voltmeter. All circuits except the actual counting circuits have been previously described heretofore in describing the programmer. Referring now to the detailed block diagram, FIGS. 3 and 3a, it can be seen that each of the counters contains counting circuits or stages which are labelled 1, 2, 4, and 8 to correspond to the binary code. Each of the blocks designated Q1D—Q2D, Q3D—Q4D, Q5D—Q6D and Q7D—Q8D contain two transistors connected in a bistable multivibrator circuit. FIG. 7 illustrates schematically one embodiment of the decade counters showing the detailed connections for the transistors Q1D—Q8D. This figure also illustrates the multivibrator and other circuits heretofore described as being located at the counter. The output lines from each counter stage are labelled with a legend consisting of a primed and an unprimed number, 1, 1', through 8, 8", to correspond with the designation of the associated stage. These lines represent the collectors of the two transistors in each multivibrator or stage. The primed and unprimed lines 1—1', 2—2', 4—4' and 8—8' of each counter feed readout storage decades 109, 110, 111 and 112 in the converter and indicator unit 31. The unprimed lines feed the readout storage decades and diode gates 29.

In the operation of a counter, the output from one stage triggers the input of a following or second stage. Count pulses, which trigger the entire operation, are applied to both sides of the 1 stage of a counter so that this stage is alternately switched on and off. FIG. 11 illustrates the signal outputs from the various counting circuits or stages. Each counter is capable of counting up to nine but the count can stop at any point.

In the initial or zero condition of each counter when all the stages are set to zero, the even-numbered transistors Q2D, Q4D, Q6D, Q8D within each stage are in their conducting state with the odd-numbered transistors Q1D, Q3D, Q5D, Q7D are cut-off. In this condition a positive signal is applied to all of the corresponding even-numbered diodes in the diode gate unit, FIGS. 1a and 9, causing them to conduct and prevent current from flowing to the junction point 21 of the comparator amplifier 22.

The first count pulse applied to the first counter stage, transistors Q1D—Q2D, will reverse the zero condition of this stage. A negative signal will be applied to the "1000 Gate" diode at the diode gate unit 29 and current is permitted to flow into the junction point 21 through the corresponding weighted resistor in the resistor matrix 80.

A second count pulse will reverse the condition of the first stage. In reverting to its initial condition, the first stage causes the second stage to be turned on. Succeeding count pulses continue to turn the first stage on and off and each time that the first stage reverts to its initial condition it reverses the condition of the second stage. The second stage in reverting to its initial condition governs the condition of the third stage, and so on down the line, as can be seen in FIG. 11.

*Binary-to-Decimal Converter and Indicator Unit*

The binary-to-decimal converter and indicator unit 31, FIG. 5, is provided with a front panel 116 so that visible "readout" may be obtained from the instrument of the present invention. In FIG. 4 the unit 31 is seen to contain a power supply which comprises a simple full-wave rectifier using semi-conductors 118, 119. Semi-conductors 118, 119 are polarized so that only the negative half of an incoming alternating voltage will pass through to a single large filter capacitor 120. A step-down transformer 122 is provided to reduce the magnitude of the incoming voltage. The output from the power supply circuit is obtained at terminal 124 and applied to the binary-to-decimal storage and converter units shown in FIGS. 4 and 5. As stated before, one of the two sign indicator lamps 102, 103 located at indicator unit 31 are energized whenever one of the two transistors Q1C and Q2C are cut-off by a signal from the sign multivibrator.

As will be remembered, an indicator clear signal is produced by the indicator clear multivibrator, the last multivibrator to be triggered in the distributor at the programmer and counters. This signal causes transistor Q3C' to open all of the diode gates at the indicator unit 31, allowing the new numbers to be read in. The collector of transistor Q3C' is connected to the converter and storage decades 109–112 through a line 4.01.

Readout Storage Decades

Each of the storage decade units 109–112 perform two functions, the first of which is to accept and store information received from the corresponding counters 25–28. The second function of the storage decade units is to decode or convert this binary information into equivalent decimal numbers which can be visually displayed. The equivalent decimal numbers are visually displayed on the panel 116 by suitable indicators comprising four groups of indicating lights. Each group of lights corresponds to a decimal column of the number to be displayed, and each column or group of lights is controlled by a corresponding counter 25–28 through the corresponding converter 109–112. Each individual light in FIG. 5 is internally labelled with a number corresponding to the digit which it displays. For example, the lights 125–128 for displaying the numeral seven in the various groups or columns are internally labelled "7." The lines in FIG. 6 which are labelled with legend 0–9 correspond to the individual lights to which they are connected.

Referring to FIG. 6, there can be seen a group of four bistable multivibrators comprising transistors Q11C–Q18C. These multivibrators perform the storage function of the indicator unit 31, and reading from left to right each group of two transistors is seen to be labelled 8, 4, 2, 1 to correspond to the binary code used throughout the apparatus. These multivibrators receive their signal inputs from the counting stages at the corresponding binary-coded decade counters 25–28 operatively associated with each readout storage decade. It will be recalled that the two output signals obtained from each counting stage are labelled with legend corresponding to the binary code with one output line primed and the other output line unprimed. This same number legend appears on the schematic diagram of FIG. 6 for the readout storage decades to indicate the interconnections between a particular storage decade and a corresponding counter.

A plurality of storage transistors Q1C–Q10C, shown at the top of FIG. 6, have their base circuit connected to the source of voltage 124. These transistor base circuits are further connected to the cathodes of a plurality of diodes, which may vary in number from two to four. For purposes of simplifying the drawing and the disclosure all of the diodes do not have reference numerals, but by way of example, the base 133 of transistor Q1C is shown to be connected to diodes 135, 136, 137 and 138. These diodes carry out the decoding function of the readout storage decade unit and are shown to be arranged in a plurality of "and" circuit configurations, viz., the anode circuits of the diodes are connected to the collector circuit of both storage transistors in the storage multivibrators. Thus, the diodes conduct in dependence upon which of the storage transistors is conducting, the anode of each diode being thus biased at either ground potential or the reference potential, source 124. Thus, each diode will either conduct or not conduct depending upon the state of the corresponding multivibrators. By way of example, if the reference potential is applied to the anodes of diodes 135, 136, 137 and 138, the transistor Q1C will conduct to energize, for example, a corresponding zero lamp 141. If any one of these diodes 135–138 is at ground potential, transistor Q1C will not be energized. Hence, diodes 135, 136, 137 and 138 must all be in their non-conducting condition for the zero lamp 141 to glow.

Assuming that a "three" lamp, such as 142 is glowing, this means that transistor Q4C in storage decade 109 is conducting. In order for this to happen, the three diodes 144, 145 and 146 must be in a non-conducting state. Similarly, transistors Q14C, Q15C, Q17C must also be in a non-conducting state.

The indicator unit 31 is provided with connections, 150, 151, 152 and 153 for providing the decoded decimal equivalent of the unknown input voltage to readout mechanisms such as a mechanical printer, not shown.

To continue with the previous example, at the point in time where the reference signal corresponds to +12.48 volts, the indicator clear multivibrator was seen to produce an output for application to the transistor Q3C'. The binary information now available at the decade counters 25–28 is made available at the transistors Q11C–Q18C in order to enable the indicator unit 31 to complete a conversion and display operation. The next subsequent blocking oscillator pulse disables the indicator clear multivibrator and in turn causes the transistors Q11C–Q18C to be disconnected from the decade counters 25–28. Thus, the digits (+12.48) displayed by the indicator unit 31 remain displayed until the next output signal from the indicator clear multivibrator.

While a preferred embodiment of the invention has been illustrated and described, it will be understood that the invention is in no way limited to this embodiment and that many changes may be made within the spirit and scope of the invention as defined by the following claims.

What I claim and desire to secure by Letters Patent is:

1. In an analog-to-digital conversion system for measuring unknown analog signals and presenting the measurements in decimal form, in combination,
    means including a plurality of binary coded decimal counters for generating binary coded decimal signals corresponding to their count a binary to decimal converter being connected to said counters for producing a reference signal of amplitude corresponding to the value of said binary coded decimal count,
    means for continuously comparing an amplitude significant input signal of unknown value with said reference signal and for supplying an output signal indicative of disagreement between the values thereof,
    each of said plurality of counters corresponding respectively to one of a plurality of decimal digits in a number the final value of which corresponds to the value of the input signal,
    said counters counting only from a minimum to a maximum count,
    programming means operatively connected to said comparing means and to said counters to vary the amplitude of the reference signal according to a predetermined program in dependence upon the output signals from said comparing means and for producing an initial condition of the reference signal by initially setting that one of said counters which corresponds to the most significant decimal digit in the number to minimum count and for initially setting the other of said counters which correspond to less significant decimal digits in the number to a maximum count, and said programming means including means for actuating said one counter to count upwardly and for successively setting each of said other counters to a minimum count and for successively actuating that minimum set counter to count upwardly until the respective decimal digit of the counter corresponds to the corresponding decimal digit of said input signal until complete agreement is obtained between the value of said input signal and said reference signal.

2. In an analog-to-digital conversion system for measuring unknown analog signals and presenting the measurements in decimal form, in combination,
    means including a plurality of binary coded decimal counters for generating binary coded decimal signals corresponding to their count, a binary to decimal converter being connected to said counters for producing a reference signal of amplitude corresponding to the value of said binary coded decimal count,
    means for continuously comparing an amplitude significant signal of unknown value with the reference signal and for supplying an output signal indicative of disagreement between the values thereof, each of said plurality of counters corresponding respectively to one of a plurality of decimal digits in a number the final value of which corresponds to the value of the input signal, and programming means operatively connected to said comparing means and to said counters to vary the amplitude of the reference signal according to a predetermined program in dependence upon the output signals from said comparing means and for producing an initial condition of the reference signal by initially setting that one of said counters which corresponds to the most significant decimal digit in the number to a minimum count and for initially setting the other of said counters which correspond to less significant decimal digits in the number to a maximum count, said reference signal being varied in value from the initial condition to first obtain agreement between the unknown value of the input signal and the reference signal in that one of said counters which corresponds to the most significant decimal digit in the number, and being thereafter varied in value successively in each of said remaining counters which correspond respectively to the next most significant decimal digit in the number until complete agreement is obtained between the value of the input signal and the reference signal, said remaining counters each being successively set to a minimum and actuated to count upwardly upon attainment of agreement between the value of the input signal and the reference signal in each of said counters corresponding to the next more significant digit in the number.

3. In an analog-to-digital conversion system for measuring unknown analog signals and presenting the measurements in decimal form, in combination, means including a plurality of binary coded decimal counters for generating binary coded decimal signals corresponding to their count, a binary to decimal converter being connected to said counters for producing a reference signal of amplitude corresponding to the value of said binary coded decimal count, means for continuously comparing an amplitude significant signal of unknown value with the reference signal and for supplying an output signal indicative of disagreement between the values thereof, each of said plurality of counters corresponding respectively to one of a plurality of decimal digits in a number the final value of which corresponds to the value of the input signal, and programming means operatively connected to said comparing means and to said counters to vary the amplitude of the reference signal according to a predetermined program in dependence upon the output signals from said comparing means and for producing an initial condition of the reference signal by initially setting that one of said counters which corresponds to the most significant decimal digit to the number to a minimum count and for initially setting the other of said counters which correspond to less significant decimal digits in the number to a maximum count, said reference signal being varied in value from the initial condition to first obtain agreement between the unknown value of the input signal and the reference signal in that one of said counters which corresponds to the most significant decimal digit in the number, and being thereafter varied in value successively in each of said remaining counters which correspond respectively to the next most significant decimal digit in the number until complete agreement is obtained between the value of the input signal and the reference signal, said remaining counters each being successively set to a minimum count and actuated to count upwardly upon attainment of agreement between the value of the input signal and the reference signal in each of said counters corresponding to the next more significant digit in the number.

4. In an analog-to-digital conversion system for measuring unknown analog signals and presenting the measurements in decimal form, in combination, means including a plurality of binary coded decimal counters for generating binary coded decimal signals corresponding to their count, a binary to decimal converter being connected to said counters for producing a reference signal of amplitude corresponding to the value of said binary coded decimal count, means for continuously comparing an amplitude significant signal of unknown value with the reference signal and for supplying either one or another output signal indicative of disagreement between the values thereof, each of said plurality of counters corresponding respectively to one of a plurality of decimal digits in a number the final value of which corresponds to the value of the input signal, and programming means operatively connected to said comparing means and to said counters to vary the amplitude of the reference signal according to a predetermined program in dependence upon the output signals from said comparing means and for producing an initial condition of the reference signal by initially setting that one of said counters which corresponds to the most significant decimal digit in the number to a minimum count and for initially setting the other of said counters which correspond to less significant decimal digits in the number to a maximum count, said reference signal being varied in value from the initial condition to first obtain agreement between the unknown value of the input signal and the reference signal in that one of said counters which corresponds to the most significant decimal digit in the number, and being thereafter varied in value successively in each of said remaining counters which correspond respectively to the next most significant decimal digit in the number until complete agreement is obtained between the value of the input signal and the reference signal, each of said remaining counters being successively set to a minimum count upon attainment of agreement between the value of the input signal and the reference signal in each of said counters corresponding to the next more significant digit in the number, said counters being instructed to count only upwardly from said minimum count in response to the occurrence of said one output signal from said comparing means.

5. The combination according to claim 4 in which said comparing means produces said other output signal only upon an indication of agreement between the values of the reference and input signals in any one of said counters.

6. The combination according to claim 5 in which said counters count only from a minimum to a maximum count.

7. In an analog-to-digital conversion system for measuring unknown analog signals and presenting the measurements in decimal form, in combination, means including at least three counters for generating an amplitude significant reference signal responsive to their count, means for continuously comparing an amplitude significant signal of unknown value with the reference signal and for supplying an output signal indicative of disagreement between the values thereof, each of said counters corresponding respectively to one of at least three decimal digits in a number the final value of which corresponds to the value of the input signal, programming means operatively connected to said comparing means and to said counters to vary the amplitude of the reference signal according to a predetermined program in dependence upon the output signals from said comparing means and for producing an initial condition of the reference signal by initially setting that one of said counters which corresponds to the most significant decimal digit in the number to a minimum count and for initially setting all of the remaining counters which correspond to less significant decimal digits in the number to a maximum count, said programming means including means connected to each of said counters for producing an actuating signal to set to a minimum count that counter which represents the next less significant decimal digit with respect to the counter previously set to its minimum count when (1) the count setting of said previously minimum set counter agrees with the corresponding decimal digit of said input signal and (2) the value of said reference signal is greater in magnitude than the value of said input signal, means for actuating each said counter to count upwardly upon application thereto of count signals, and said programming means including additional means for application to said counter last set to its minimum count of count signals only (1) when the magnitude of said reference signal is less than the magnitude of said input signal and (2) until the count attained by said actuated counter agrees with the corresponding decimal digit to said input signal.

8. The conversion system of claim 7 in which there is provided means including said set circuits for setting all of said counters to a minimum count prior to the production of said initial condition of said reference signal.

9. In an analog-to-digital conversion system for measuring unknown analog signals and presenting the measurements in decimal form, in combination, at least three binary coded decimal counters each including at least one set circuit for generating binary coded decimal signals corresponding to their count, a binary to decimal converter being connected to said counters for producing a reference signal of amplitude corresponding to the value of said binary coded decimal count, means for continuously comparing an amplitude significant signal of unknown value with the reference signal for and for supplying an output signal indicative of disagreement between the values thereof, each of said counters corresponding respectively to one of at least three decimal digits in a number the final value of which corresponds to the value of the input signal, programming means operatively connected to said comparing means and to said counters to vary the amplitude of the reference signal according to a predetermined program in dependence upon the output signals from said comparing means and for producing an initial condition of the reference signal by application of signals to said set circuits for initially setting that one of said counters which corresponds to the most significant decimal digit in the number to a minimum count and for initially setting all of the remaining counters which correspond to less significant decimal digits in the number to a maximum count, said programming means including shift means connected to each of said counters for producing from the counter last set to its minimum count an actuating signal for application to the set circuit of the counter which represents the next less significant decimal digit with respect to said last minimum set counter to set to a minimum count said last significant digit counter when (1) the count setting of said last minimum set counter agrees with the corresponding decimal digit to said input signal and (2) the value of said reference signal is greater in magnitude than the value of said input signal, means for actuating each said counter to count upwardly upon application thereto of count signals, and said programming means including additional means for application to said counter last set to its minimum count of count signals only (1) when the magnitude of said reference signal is less than the magnitude of said input signal and (2) until the count attained by said actuated counter agrees with the corresponding decimal digit of said input signal.

10. The conversion system of claim 9 in which there is provided means including said set circuits for setting all of said counters to a minimum count prior to the production of said initial condition of said reference signal.

References Cited in the file of this patent

UNITED STATES PATENTS

| | | |
|---|---|---|
| 2,717,994 | Dickinson et al. | Sept. 13, 1955 |
| 2,775,754 | Sink | Dec. 25, 1956 |
| 2,784,396 | Kaiser et al. | Mar. 5, 1957 |
| 2,836,356 | Forrest et al. | May 27, 1958 |
| 2,839,744 | Slocomb | June 13, 1958 |
| 2,865,564 | Kaiser | Dec. 23, 1958 |
| 2,940,071 | Kindred | June 7, 1960 |

OTHER REFERENCES

Edwards: Design of a Digital Voltmeter, Electronic Equipment, August 1955, pp. 20 to 23.

Coleman: Technical Bulletin—No. CR-179, Coleman Engineering Co., Inc., Los Angeles 16, Calif., received Sept, 11, 1956, 8 pages.

Ballard: Multi-Channel Telemeter Data Handling System, IRE Transactions—PGI, No. 2, June 1953, pages 109, 111.